No. 791,448. PATENTED JUNE 6, 1905.
M. W. BRENDER.
ANIMAL WEANER.
APPLICATION FILED MAY 23, 1904.
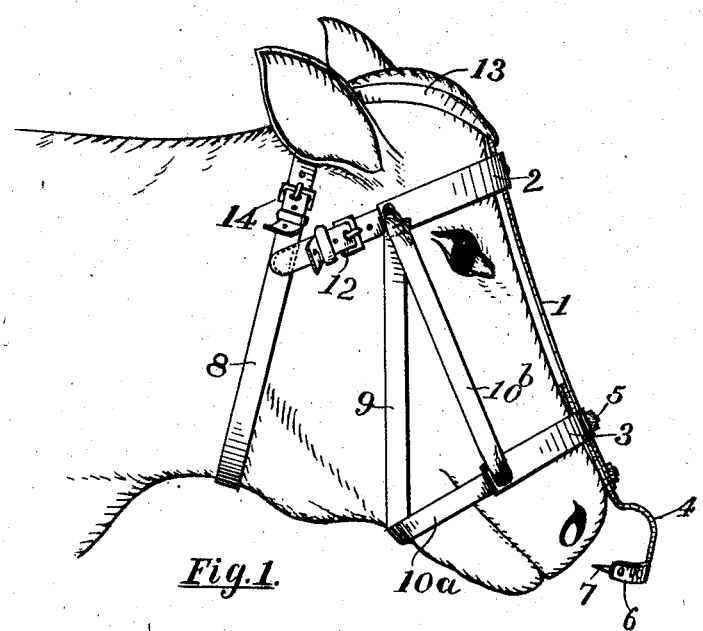
Fig.1.
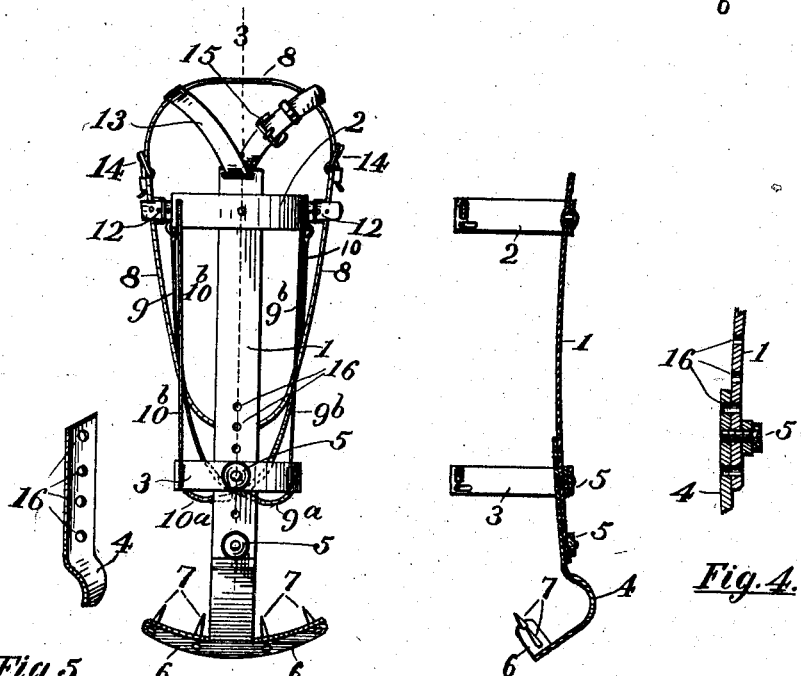
Fig.5.
Fig.2.
Fig.3.
Fig.4.
Witnesses
Georgiana Chace
Edward R. Monroe
Inventor
Mary W. Brender
By Luther V. Moulton
Attorney No. 791,448. Patented June 6, 1905.

UNITED STATES PATENT OFFICE.

MARY W. BRENDER, OF TROWBRIDGE, MICHIGAN.

ANIMAL-WEANER.

SPECIFICATION forming part of Letters Patent No. 791,448, dated June 6, 1905.

Application filed May 23, 1904. Serial No. 209,247.

*To all whom it may concern:*

Be it known that I, MARY W. BRENDER, a citizen of the United States, residing at Trowbridge, in the county of Allegan and State of Michigan, have invented certain new and useful Improvements in Animal-Weaners; and I do hereby declare the following to be a full, clear, and exact description of the invention, such as will enable others skilled in the art to which it appertains to make and use the same.

My invention relates to improvements in animal-weaners; and its object is to provide a device that cannot be displaced when applied for use, to provide means for ready adjustment of the same to fit the animal, to provide a device of convenient and certain operation, to provide a device that will not seriously injure the animal, and to provide the same with various new and useful features hereinafter more fully described, and particularly pointed out in the claims.

My invention consists, essentially, in the combination and arrangement of parts hereinafter described, reference being had to the accompanying drawings, in which—

Figure 1 is a side elevation of a device embodying my invention as it appears when applied for use; Fig. 2, a front elevation of the same detached; Fig. 3, a sectional detail taken on the line 3 3 of Fig. 2; Fig. 4, an enlarged detail of the adjusting means for the same, and Fig. 5 a perspective detail of the upper part of the spring 4.

Like numerals refer to like parts in all of the figures.

The frame of the device consists, preferably, of a bar 1, of metal, wood, or other suitable rigid material, preferably formed to fit the face of the animal and adapted to extend vertically along the center of the same, and transverse curved members 2 and 3, of similar material, bent to transversely fit and embrace the face, and attached near the middle to the bar 1, the member 2 being attached near the upper end thereof and adapted to embrace the forehead of the animal, and 3 being attached near the lower end of the bar 1 and adapted to embrace the nose of the same, and thus securely hold the frame in proper place. Attached to this frame, and preferably to the lower end of the bar 1 and longitudinally adjustable thereon, is a spring 4 of suitable flexible material, preferably of spring-steel, which spring extends beyond the bar 1 and thence in a curve outward and then slanting downward, terminating opposite the nose of the animal and at a proper distance therefrom. This spring is longitudinally adjusted on the frame to properly locate its lower end, and for that purpose a series of openings 16 are provided in the frame and spring in which are inserted suitable fastenings 5, consisting, preferably, of thumb-screws or bolts. The lower end of the spring 4 is laterally extended, as at 6, and preferably somewhat curved and with its concave side toward the nose of the animal. Extending inward and inclined downward toward the nose of the animal and rigidly attached to this extension are spikes 7, normally held at a short distance from the animal's nose and adapted to engage the same whenever the spring 4 or the extension 6 are pressed against any object, such as the udder of the cow, and thus effectually restrain the animal. These spikes are normally held sufficiently above the mouth of the animal, so that they do not interfere with eating or drinking. Any contact of the end of the spring or plate 6 with anything below the nose of the animal will move the spikes outward and upward instead of toward the nose, and thus out of the way for eating and drinking or reaching any object directly below the mouth, as occasion may require.

To secure the described frame in place, suitable straps, tapes, or cords are applied thereto as follows: A suitable strap 8 is extended around the neck of the animal just back of the ears and is adjustably secured by one or more suitable buckles 14. To this strap near the top is attached the respective ends of a supporting-strap 13, which strap extends through a suitable opening in the upper end of the bar 1 and is adjusted for length by a suitable buckle 15. The ends of this strap 13 are spaced apart, and thus it embraces the upper part of the head of the animal and tends to hold the parts in place laterally. To the respective ends of the member 2 are attached suitable straps 9 and 10, which thence extend downward and are crossed beneath the under jaw of the animal, as at 9ª and 10ª, and thence extend through openings in the opposite ends of the member 3 and thence upward alongside of the respective sides of the face, as at 9ᵇ and 10ᵇ, and thence through suitable openings in the respective ends of the member 2 and from thence to the strap 8. The straps 9 and 10 are free to move longitudinally through the openings in the members 2 and 3 and are adjusted for length by suitable buckles 12. This described system of straps securely and effectually holds the frame in place upon the animal and prevents all efforts of the same to displace the device by rubbing against any obstruction or otherwise, for should the straps at one side be forcibly engaged with any obstruction the tendency to turn the device around or to one side would be immediately counteracted by the transmission of the strains to the other part of the straps at the other side of the face. The straps 8, 9, and 10, extending under the neck and jaw, effectually hold the frame down in place, and the strap 13 supports the same. Furthermore, the substantially rigid embracing-arms of the members 2 and 3 further tend to prevent turning the device out of position in either direction, the result being that it is practically impossible for the animal to displace the device when once properly adjusted.

Having thus fully described my invention, what I claim, and desire to secure by Letters Patent, is—

1. The combination of a frame comprising a central longitudinal bar and transverse curved members adapted to embrace the face of an animal, means for securing the frame in place comprising suitable straps and buckles, a spring attached to the frame and extending outward and slanting downward therefrom, and spikes attached to the flexible end of the spring.

2. The combination of a frame comprising a central longitudinal bar and two curved transverse members attached thereto and adapted to embrace the face of an animal, a spring adjustably attached to the frame and extending in a curve, outward and downward therefrom, spikes attached to the lower end of the spring, and means for securing the frame in place comprising a strap to extend around the neck of the animal, straps extending from the frame to said strap, and means for adjusting the length of said straps.

3. The combination of a frame comprising a central longitudinal bar and an upper and lower transverse curved member each adapted to embrace the face of an animal, and each having openings in their respective ends; a spring adjustably attached to the frame, lateral extensions on the end of the spring, spikes rigidly supported by the extensions, a strap to extend around the neck of the animal, and straps attached to the upper transverse member of the frame and crossed to extend beneath the jaw of the animal, and thence extending through openings in the lower transverse member, and from thence extending through the upper member and to the neck-strap and attached thereto, and means for adjusting the length of said straps.

4. The combination of a frame comprising a longitudinal bar, and upper and lower transverse curved members, a neck-strap to extend around the neck of the animal, a strap extending from the upper part of the neck-strap to the upper end of the bar and adjustable for length, and straps extending through openings in the respective ends of the transverse members, said straps being crossed to extend beneath the jaw, and thence extended through the upper member, and to the neck-strap and attached thereto, and means for adjusting the length of said straps.

5. In combination with a frame comprising a longitudinal bar, and upper and lower curved members having openings in their respective ends, a strap to extend around the neck of the animal, and two straps attached to the respective ends of the upper member and thence crossed and passed through openings in the lower member and thence extending through openings in the upper member, and thence extended to the neck-strap and attached thereto, buckles to adjust the length of said straps, and a strap extending from the upper part of the neck-strap and attached to the upper end of the frame.

6. A frame comprising a longitudinal bar, and upper and lower transverse curved members having openings in their respective ends; a neck-strap to surround the neck of the animal, a strap attached at its respective ends to the upper part of the neck-strap and spaced apart having its middle portion connected to the upper end of said bar, a buckle for adjusting the length of said strap, and straps connecting the neck-strap and the respective ends of the curved members, said straps being crossed and slidable in the openings in said members.

7. The combination of a frame comprising a longitudinal bar, and an upper and a lower transverse curved member having openings in their respective ends; a spring adjustably attached to said frame and extending in a curve outward and downward therefrom, lateral extensions to the spring, spikes projecting inward from the extension, a neck-strap, a strap attached to the upper part of said bar and to the neck-strap, two straps attached to the respective ends of the upper members, thence extending downward and crossed and inserted in the openings of the lower member and thence extended to the upper member and through the openings of the same and thence extended to the neck-strap and attached thereto, and buckles for adjusting the said straps.

8. The combination of a rigid frame adapted to fit and embrace the face of an animal, means for securing the frame in place on an animal, a spring attached to the lower end of the frame, and extending in a curve and outward therefrom and slanting downward relative to the frame, and spikes attached to the movable end of the spring and inclined inward and downward therefrom.

In testimony whereof I affix my signature in presence of two witnesses.

MARY W. BRENDER.

Witnesses:
LUTHER V. MOULTON,
GEORGIANA CHACE.